US006327758B1

(12) United States Patent
Petrakis et al.

(10) Patent No.: US 6,327,758 B1
(45) Date of Patent: Dec. 11, 2001

(54) RESILIENT UNITARY LIGHTING CLIP

(75) Inventors: John Petrakis, Cary; George L. Janos, Bartlett, both of IL (US)

(73) Assignee: Juno Manufacturing, Inc., Des Plaines, IL (US)

( * ) Notice: Subject to any disclaimer, the term of this patent is extended or adjusted under 35 U.S.C. 154(b) by 0 days.

(21) Appl. No.: 09/431,382

(22) Filed: Nov. 1, 1999

(51) Int. Cl.[7] .............................. B42F 13/00; F16B 5/06; F21V 21/08

(52) U.S. Cl. ................................ 24/546; 24/293; 24/295; 24/336; 24/563

(58) Field of Search ............................ 24/546, 336, 317, 24/293, 295, 563; 52/489, 760

(56) References Cited

U.S. PATENT DOCUMENTS 3,858,370 * 1/1975 Halstead ................................ 52/760
3,934,387 * 1/1976 Moeller .................................. 52/760
4,033,079 * 7/1977 Cross, Jr. ................................ 52/99
4,088,293 * 5/1978 Delmore .............................. 248/500
4,723,749 * 2/1988 Carraro et al. ......................... 24/336
5,987,714 * 11/1999 Smith .................................... 24/293
6,033,098 * 3/2000 Hentz et al. ......................... 362/430

FOREIGN PATENT DOCUMENTS

0840556 * 7/1960 (GB) ..................................... 24/295

* cited by examiner

*Primary Examiner*—Victor N. Sakran
(74) *Attorney, Agent, or Firm*—Anthony S. Zummer

(57) ABSTRACT

The subject matter is a resilient unitary lighting clip which connects a bar hanger to a T-bar in an overhead lighting assembly. The clip includes a face plate which has a lock formed integral with the face plate to secure the clip to the bar hanger. A U-shaped connector is formed integral with the face plate for receiving a bar hanger. A support is formed integral with the connector for receiving a portion of a T-bar. A catch is formed integral with the support and is resiliently connectable to the T-bar. A tab is formed integral with the support and is engageable with the T-bar for positioning the clip relative to the T-bar.

12 Claims, 3 Drawing Sheets

RESILIENT UNITARY LIGHTING CLIP

BACKGROUND OF THE INVENTION

Drop ceilings in both residential and commercial establishments often utilize recessed lighting fixtures to create overhead lighting assemblies. In a typical construction of a drop ceiling, T-bars are suspended by wires from supporting members. The drop ceiling allows various utilities to be mounted above the ceiling, such as air ducts. The lighting fixtures which are utilized in conjunction with the drop ceiling are conventional in their construction and are usually supported on the T-bars by conventional bar hangers. One of the problems encountered in attaching bar hangers to the T-bars is the provision of means for easily attaching the bar hanger to the T-bar. The means for securing the bar hanger to the T-bar must allow the bar hanger to be held in place, but also it must to be readily shifted in position to accommodate positioning of a lighting fixture to a desired position along the T-bar. A typical means for attaching a bar hanger to a T-bar is a clip which is easily secured to a bar hanger and to a T-bar.

A well-known prior art clip 10 for securing a conventional bar hanger to a T-bar is shown in FIGS. 1, 2, and 3. Clip 10 is locked to an ear 12 of a conventional bar hanger 14. The clip is mounted on a conventional residential T-bar 16 which includes a flange 18 and a base 20. A bar head 22 is secured to the upper edge of flange 18. The clip 10 secured to head 22 of T-bar 18.

Prior art clip 10 includes a face plate 24 which has a generally flat body 26. An upper hook 28 is formed integral with the upper edge of flat body 26 and a lower hook 30 is formed integral with the lower edge of the flat body and is off-set from hook 28, as may be seen in FIG. 3. Hooks 28 and 30 have hook lips 32 and 34, respectively, to facilitate insertion of ear 12 of the bar hanger between the hooks. Flat body 26 has a pair of protuberances 36 and 38 for mating engagement with portions of ear 12. Ear 12 has a pair of recesses 40 and 42 which receives protuberances 36 and 38, respectively, to interconnect the ear and the clip.

Clip 10 includes a pair of parallel back arms 44 and 46. Back arms 44 and 46 have walls 48 and 50, respectively, which are formed integral with flat body 26. Back fingers 52 and 54 are formed integral with walls 48 and 50, respectively. As may be seen in FIG. 3, back arms 44 and 46 are positioned adjacent to opposite edges of flat body 26.

A locking finger 56 is formed integral with the flat body between the back arms 44 and 46. The locking finger is positioned adjacent to arm 44 and spaced from arm 46, as may be seen in FIG. 3. The locking finger includes a curved strut 58 having one end formed integral with flat body 26. A flat extension 60 is formed integral with curved strut 58 and extends below back arms 44 and 46, as shown in FIG. 2.

Clip 10 is attached to ear 12 of the bar hanger through the interaction of the hooks to retain the ear and the protuberances. The clip is secured to the T-bar 16 at head 22 by raising the flat extension of locking finger 56 to allow the back fingers of the back arms to be positioned under head 22. The resilience of the locking finger urges the locking finger into engagement with the upper edge of head 22 to lock the clip to the T-bar.

In order to remove the clip from the T-bar, it is necessary to move the locking finger 56 out of engagement with the head and thereby allow the back fingers to be disengaged from under the head.

One of the problems encountered in mounting the bar hangers is that in some instances the T-bars have an enlarged head, as shown in FIGS. 10 and 11. The clip 10 is not effective with T-bars having enlarged heads. It is desirable to provide a clip which is capable of being used with the T-bar 16 shown in FIG. 1, and the T-bars shown in FIGS. 10 and 11. The T-bar shown in FIG. 1 is generally utilized in residential applications, whereas the T-bar shown in FIGS. 10 and 11 are generally utilized in commercial applications.

BRIEF SUMMARY OF THE INVENTION

The present invention is an improved resilient unitary lighting clip for releasably connecting a bar hanger to a T-bar in an overhead lighting assembly. The clip includes a face plate engageable with the bar hanger. A lock is formed integral with the face plate and is engageable with the bar hanger for securing the clip to the bar hanger. A U-shaped connector is formed integral with the face plate for receiving a portion of the bar hanger and holding the bar hanger in engagement with the face plate. A support is formed integral with the connector for receiving a portion of a T-bar. A catch is formed integral with the support for resilient connection to a portion of the T-bar. A tab is formed integral with the support and is engageable with the T-bar for releasably locking the clip to the T-bar.

DETAILED DESCRIPTION OF THE INVENTION

Figure 1:
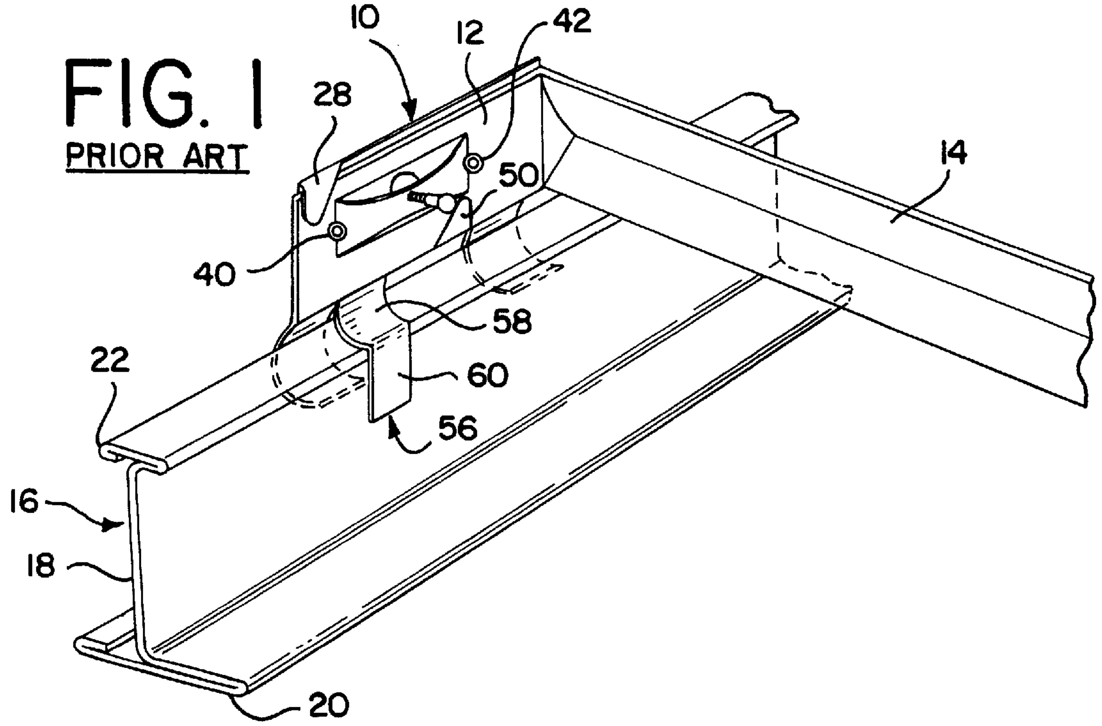
FIG. 1 PRIOR ART
FIG. 1 is a perspective view of a portion of a T-bar, which is a portion of an overhead lighting assembly with a lighting clip, which is a prior art device, releasably locking a bar hanger to the T-bar.
Figure 2:
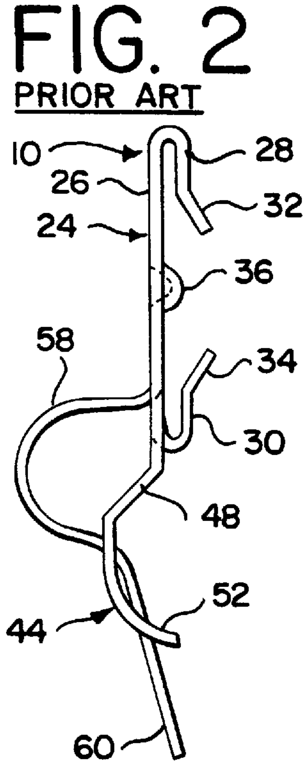
FIG. 2 PRIOR ART
FIG. 2 is a side elevational view of the prior art lighting clip shown in FIG. 1.
Figure 3:
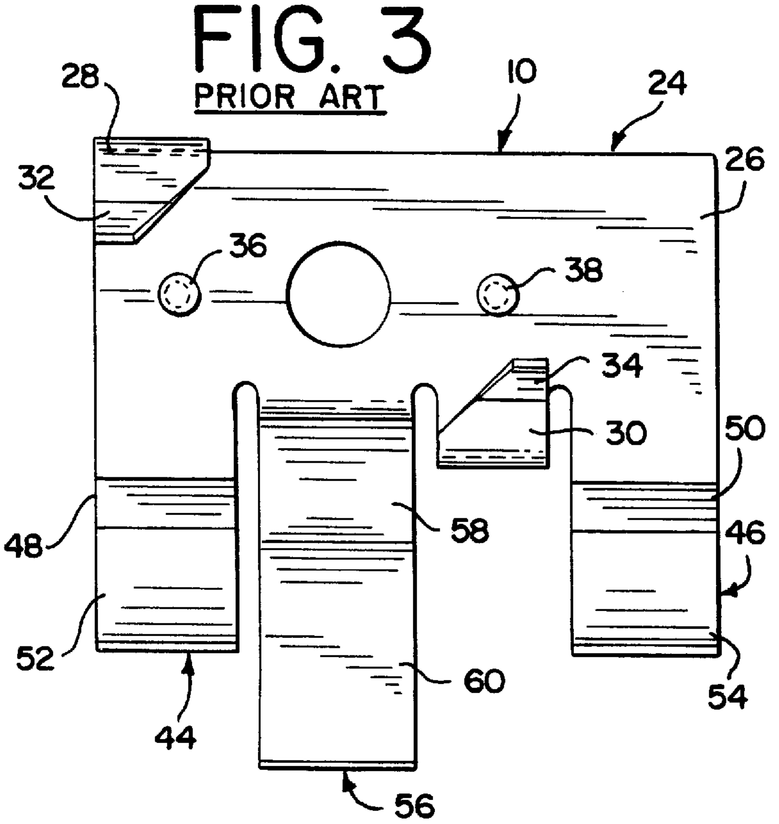
FIG. 3 PRIOR ART
FIG. 3 is an elevational view of the prior art lighting clip shown in FIGS. 1 and 2.
Figure 4:
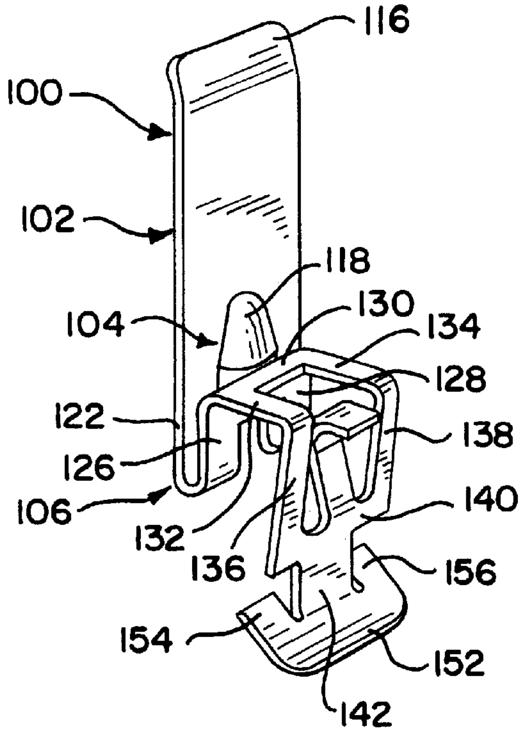
FIG. 4 is a perspective view of a lighting clip embodying the herein disclosed invention.
Figure 9:
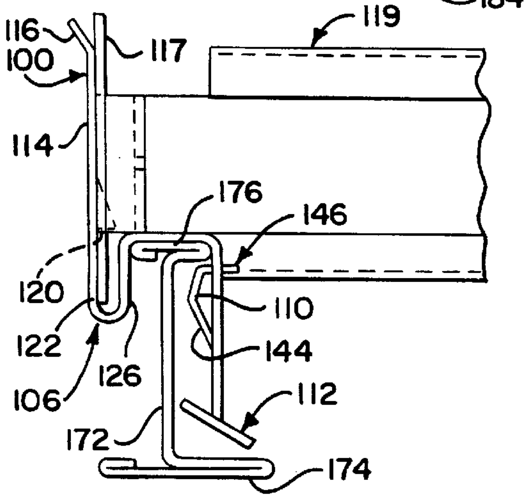
FIG. 9 is an end view taken on Line 9—9 of FIG. 8.
Figure 11:
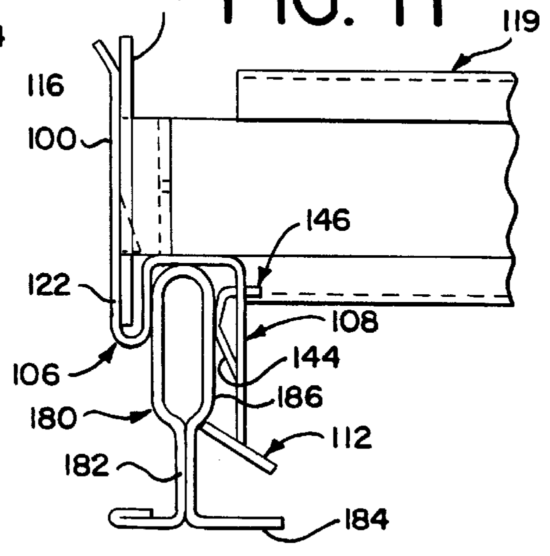
FIG. 11 is an end view taken on Line 11—11 of FIG. 10.

Referring now to the drawings, and especially to FIG. 4, a resilient unitary lighting clip 100 embodying the present invention is shown therein. The clip is made of a single piece of highly resilient steel, though any other suitable material may be used. Clip 100 includes a face plate 102 which is adapted for engagement with an ear of a conventional bar hanger, as is described in detail hereinafter. A lock 104 is formed integral with the face plate and is engageable with the ear of a bar hanger to secure the clip to the bar hanger. A U-shaped connector 106 is formed integral with the face plate and is adapted for receiving a portion of the bar hanger ear to hold the bar hanger in engagement with face plate 102. A forked support 108 is formed integral with connector 106 for receiving a portion of a T-bar which is to be connected to the bar hanger. A catch 110 is formed integral with a portion of the support for resilient connection to a portion of the T-bar, as is described in detail below. A tab 112 is formed integral with support 108 and is engageable with a T-bar for positioning the clip relative to the T-bar, as shown in FIGS. 9 and 11.

Face plate 102 includes a flat body 114 with a bent edge 116 formed integral therewith. The bent edge extends away from lock 104 to facilitate connection with an ear 117 of a conventional bar hanger 119.

Lock 104 includes a locking projection 118 extending out of flat body 114. The locking projection includes an engagement edge 120 adjacent to the U-shaped connector for contacting the ear of bar hanger, as may be seen in FIGS. 9 and 11.

U-shaped connector 106 includes a pair of spaced apart parallel plate arms 122 and 124. The plate arms 122 and 124 are formed integral with a lower edge of flat body 114. Connector arms 126 and 128 are formed integral with plate arms 122 and 124, respectively. Each connector arm is substantially parallel to its respective plate arm to form a U-shaped receptacle portion for receiving the bar hanger ear.

Figure 5:
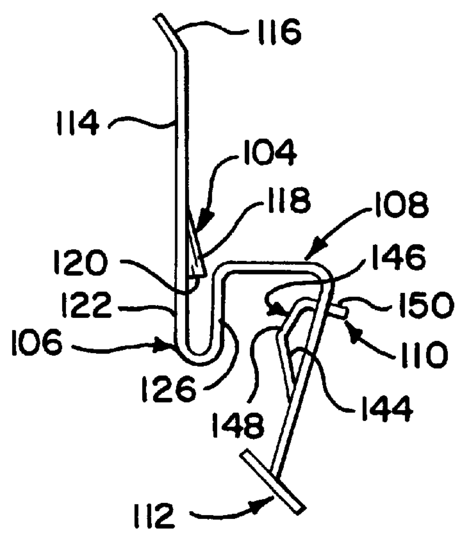
FIG. 5 is an end view of the lighting clip of FIG. 4.
Figure 6:
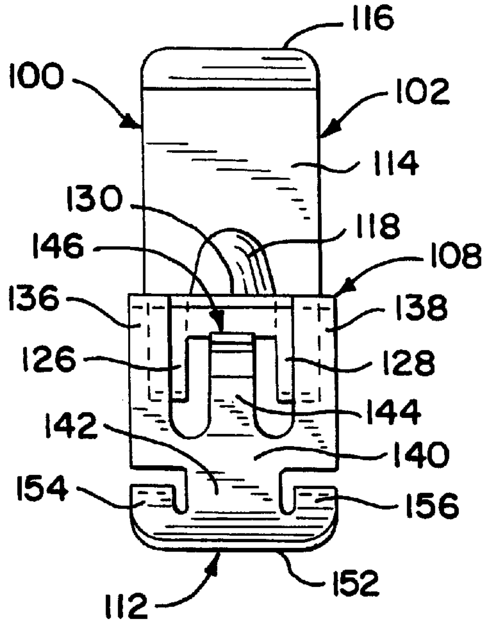
FIG. 6 is a front elevational view of the lighting clip of FIG. 4.
Figure 7:
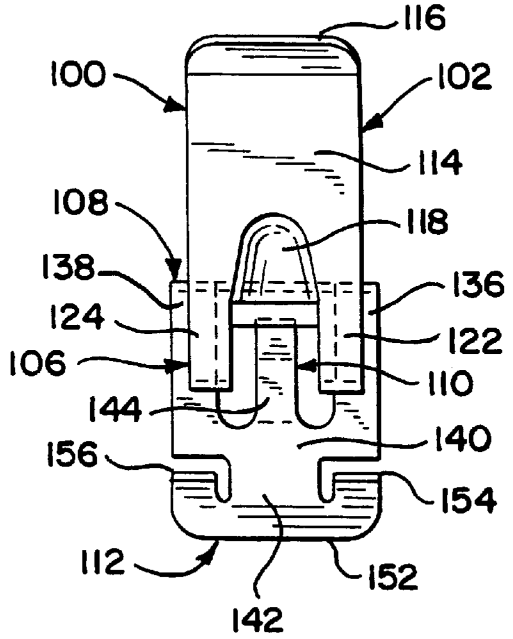
FIG. 7 is a rear elevational view of the lighting clip of FIG. 4.

Support 108 is formed integral with connector arms 126 and 128. Support 108 includes a brace 130 formed integral with connector arms 126 and 128. The brace is perpendicular to the connector arms. A pair of stays 132 and 134 is formed integral with brace 130. The stays are perpendicular to the brace and are parallel to each other. Uprights 136 and 138 are formed integral with stays 132 and 134, respectively. The uprights are substantially parallel to each other. A support base 140 is formed integral with uprights 136 and 138 to interconnect the uprights. The support base is perpendicular to the uprights. A post 142 is formed integral with support base 140 perpendicular to the support base and positioned midway between the uprights. Post 142, support base 140, and uprights 136 and 138 are all in substantially the same plane, as may be best seen in FIGS. 4 and 5.

Catch 110 is formed integral with support base 140 of support 108 and is positioned midway between uprights 136 and 138, so that catch is balanced between the uprights. Catch 110 includes a resilient bracket 144 formed integral with the support base midway between the uprights and opposite post 142 extending toward the connector arms 126 and 128. A dog 146 is formed integral with bracket 146 for engagement with a T-bar. The dog includes a stand 148 having a stand end integral with the bracket and a shoulder 150 formed integral with the stand.

The tab 112 includes a flat back 152 with a pair of lips 154 and 156 formed integral adjacent to opposite edges of the back. The tab is generally flat so that the back and lips are in the same plane.

Figure 8:
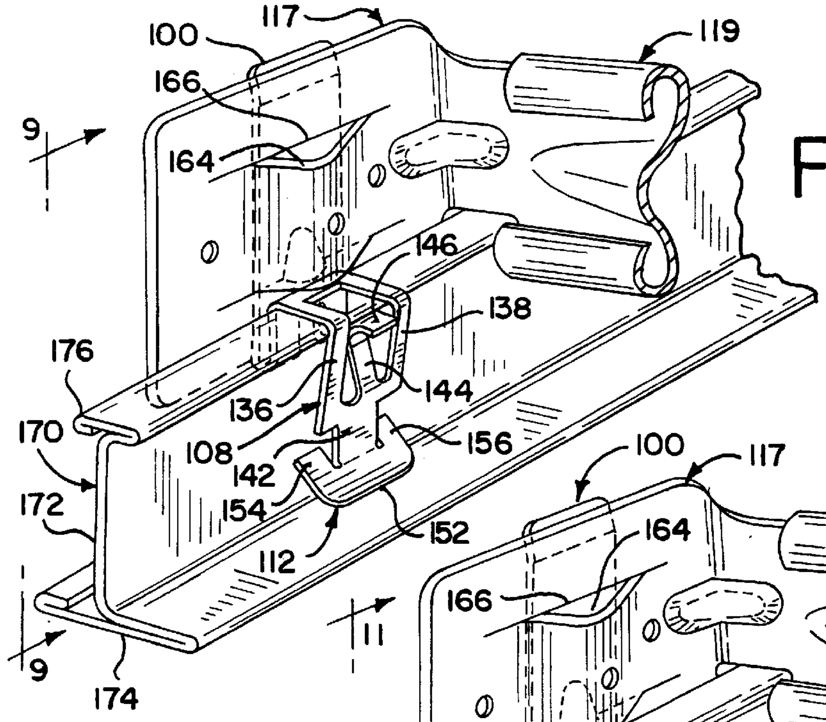
FIG. 8 is a perspective view of the clip of FIG. 4 shown mounted on a bar hanger and releasably attached to a T-bar of the type generally used in residential applications.

As may be seen in FIG. 8, the clip is attached to conventional bar hanger 119 which has ear 117. As is conventional, the ear includes a raised portion 164 which provides a receptacle portion 166 for receipt of locking projection 118. The clip is slipped onto the bar hanger ear with the lower edge of the bar hanger in U-shaped connector 106. Lock 104 locks the clip to the bar hanger through the contact of engagement edge 120 with the bar hanger ear, as is conventional and well known. The bar hanger with the clip may be easily mounted on a T-bar which is part of an overhead lighting assembly. Looking now to FIG. 8, a T-bar 170 of the type which is conventionally used with lighting assemblies in residential installations is shown therein. The T-bar, as is conventional, includes a flange 172 with a base 174. A T-bar head 176 is formed integral with the upper edge of flange 172. The bar hanger with the clip is simply mounted onto T-bar 170 by pivoting slightly the clip and the attached bar hanger to place lips 154 and 156 and tab 112 under the T-bar head. The clip is moved downward so that dog 146 of catch 110 is displaced as it passes over the head. The resilience of bracket 144 engages dog 146 under the T-bar head once the dog passes the T-bar head to lock the clip and the bar hanger to the T-bar.

Clip 100 may be readily moved along the T-bar 170 simply by disengaging the dog from the head of the T-bar. The clip also may be removed simply by moving dog 146 away from the T-bar head and rotating the bar slightly to disengage the tab from the T-bar.

Figure 10:
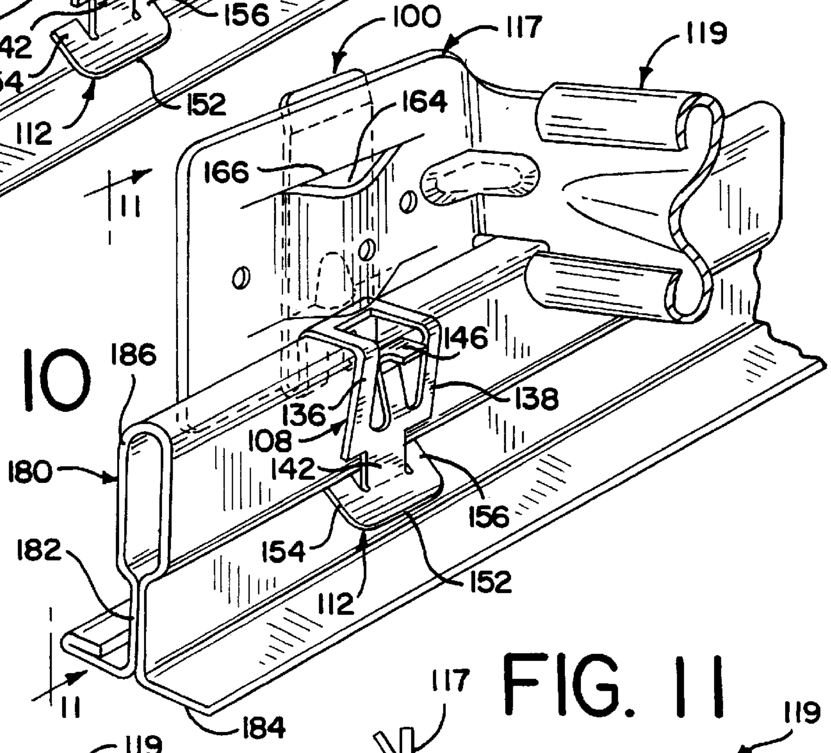
FIG. 10 is a perspective view of the lighting clip of FIG. 4 shown connected to a bar hanger and mounted on a T-bar of the type generally used in commercial applications.

As may be seen in FIGS. 9 and 10, the subject clip may be utilized to secure a bar hanger to a T-bar 180 which is the type which is commonly used in a commercial environment. T-bar 180 includes a flange 182 with a conventional base 184. However, the T-bar 180 has an enlarged head 186 which is substantially different in construction to head 176 of T-bar 170. The clip 100 is used in the same manner to connect the clip to the bar hanger 119. However, the clip is attached to T-bar 180 by simply moving the clip downward along the side of head 186. The resilience of post 142 and uprights 136 and 138 allows lips 154 and 156 to be displaced. However, once the lips pass the side of head 186, the resilience of the uprights and post locks the lips under head 186. As may be seen in FIG. 11, the catch 100 urges the head toward the connector arms 126 and 128 to hold the clip into position relative to the head while the tab 112 prevents ready displacement of the clip relative to T-bar 180.

From the foregoing, it is readily apparent that the instant clip may be used with a T-bar of either the type commonly used in residential applications, or the type which is commonly used in commercial applications. Furthermore, the clip may be readily moved along its respective T-bar.

Although a specific embodiment of the herein disclosed invention has been shown and described in detail above, it is readily apparent that those skilled in the art may make various changes and modifications without departing from the scope and spirit of the invention. It is to be expressly understood that the instant invention is limited only by the appended claims.

What is claimed is:

1. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab formed integral with the support and engageable with the T-bar for positioning the clip relative to the T-bar, said lock includes a locking projection formed integral with the face plate and extending toward the support, said locking projection having an engagement edge adjacent to the U-shaped connector for contacting the bar hanger.

2. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab engageable with the T-bar for positioning the clip relative to the T-bar, the support includes a brace formed integral with the U-shaped connector, a pair of stays formed integral with the brace and being substantially parallel to each other, an upright formed integral with each of the stays, a support base formed integral with the uprights, and a post formed integral with the support base and extending away from the uprights, said uprights, the support base, and the post being in substantially one plane, said tab formed integral with the post.

3. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab formed integral with the support and engageable with the T-bar for positioning the clip relative to the T-bar, the catch includes a resilient bracket having one end formed integral with the support, and a dog formed integral with the bracket at an end opposite the one end and being engageable with the T-bar, said dog includes a stand having a stand end integral with the bracket and a shoulder integral with the stand.

4. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab formed integral with the support and engageable with the T-bar for positioning the clip relative to the T-bar, the U-shaped connector includes a pair of plate arms formed integral with the face plate, said plate arms being parallel to each other, and a connector arm formed integral with each of the plate arms, each connector arm being substantially parallel to its respective plate arm, said support formed integral with the connector arms, and said tab includes a back formed integral with the support, and a pair of lips formed integral with the back and extending toward the face plate, said lips being engageable with the T-bar.

5. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab formed integral with the support and engageable with the T-bar for positioning the clip relative to the T-bar, the support includes a brace formed integral with the connector, a pair of stays formed integral with the brace and being substantially parallel to each other, an upright formed integral with each of the stays, a support base formed integral with the uprights, and a post formed integral with the support base and extending away from the uprights, said uprights, the support base, and the post being in substantially one plane, and said catch includes a resilient bracket having one end formed integral with the support base, a dog formed integral with the bracket at an end opposite the one end, said dog engageable with the T-bar.

6. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab formed integral with the support and engageable with the T-bar for positioning the clip relative to the T-bar, the lock includes a locking projection formed integral with the face plate and extends toward the support, said locking projection having an engagement edge adjacent to the U-shaped connector for contacting the hanger bar, said catch includes a resilient bracket having one end formed integral with the support, and a dog formed integral with the bracket at an end opposite the one end, said dog engageable with the T-bar.

7. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab formed integral with the support and engageable with the T-bar for positioning the clip relative to the T-bar, the U-shaped connector includes a pair of plate arms formed integral with the face plate, said plate arms being parallel to each other, and a connector arm formed integral with each of the plate arms, each connector arm being substantially parallel to its respective plate arm, and said support includes a brace formed integral with the connector arms, a pair of stays formed integral with the brace and being substantially parallel to each other, an upright formed integral with each of the stays, a support base formed integral with the uprights, and a post formed integral with the support base and extending away from the uprights, said uprights, the support base, and the post being in substantially one plane, said post integral with the tab.

8. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab formed integral with the support and engageable with the T-bar for positioning the clip relative to the T-bar, the lock includes a locking projection formed integral with the face plate and extending toward the support, said locking projection having an engagement edge adjacent to the U-shaped connector for contacting the bar hanger; said support includes a brace formed integral with the connector, a pair of stays formed integral with the brace and being substantially parallel to each other, an upright formed integral with each of the stays, a support base formed integral with the uprights, and a post formed integral with the support base and extending away from the uprights, said uprights, the support base, and the post being in substantially one plane, and said catch includes a a resilient bracket having one end formed integral with the support base, a dog formed integral with the bracket at an end opposite the one end, said dog being engageable with the T-bar.

9. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab formed integral with the support and engageable with the T-bar for positioning the clip relative to the T-bar, the support includes a brace formed integral with the connector, a pair of stays formed integral with the base and being substantially parallel to each other, an upright formed integral with each of the stays, a support base formed integral with the uprights, and a post formed integral with the support base midway between the uprights, said post extending away from the uprights, said uprights, and the support base being in substantially one plane, said post being in the same plane as the support base; said catch includes a resilient bracket having one end formed integral with the support base between the uprights, a dog formed integral with the bracket at an end opposite the one end, said dog being engageable with the T-bar, said dog including a stand having one end integral with the bracket and a shoulder integral with the stand, and said tab includes a back formed integral with the post, and a pair of lips formed integral with the back and extending toward the face plate, said back and said lips being in the same plane, said lips being engageable with the T-bar.

10. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab formed integral with the support and engageable with the T-bar for positioning the clip relative to the T-bar, the lock includes a locking projection formed integral with the face plate and extending toward the support, said locking projection having an engagement edge adjacent to the U-shaped connector for contacting the hanger bar; said U-shaped connector includes a pair of plate arms formed integral with the face plate, said plate arms being parallel to each other, and a connector arm formed integral with each of the plate arms, each connector arm being substantially parallel to its respective plate arm; said support includes a brace formed integral with the connector arms, a pair of stays formed integral with the brace and being substantially parallel to each other, an upright formed integral with each of the stays, a support base formed integral with the uprights, and a post formed integral with the support base and extending away from the uprights, said uprights, the support base, and the post being in substantially one plane; and said catch includes a resilient bracket having one end formed integral with the support base between the uprights, a dog formed integral with the bracket at an end opposite the one end, said dog being engageable with the T-bar, said dog including a stand having one end integral with the bracket and a shoulder integral with the stand.

11. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab engageable with the T-bar for positioning the clip relative to the T-bar, the U-shaped connector includes a pair of plate arms formed integral with the face plate, said plate arms being parallel to each other, and a connector arm formed integral with each of the plate arms, each connector arm being substantially parallel to its respective plate arm; said support includes a brace formed integral with the connector arms, a pair of stays formed integral with the base and being substantially parallel to each other, an upright formed integral with each of the stays, a support base formed integral with the uprights, and a post formed integral with the support base and extending away from the uprights, said uprights, the support base, and the post being in substantially one plane; said catch includes a resilient bracket having one end formed integral with the support base midway between the uprights, a dog formed integral with the bracket at an end opposite the one end, said dog engageable with the T-bar; and said tab includes a back formed integral with the post, and a pair of lips formed integral with the back and extending toward the face plate, said lips being engageable with the T-bar.

12. A resilient unitary lighting clip for releasably connecting a bar hanger to a T-bar in an overhead lighting assembly comprising; a face plate engageable with the bar hanger, a lock formed integral with the face plate and being engageable with a bar hanger for securing the clip to the bar hanger, a U-shaped connector formed integral with the face plate for receiving a portion of the bar hanger and holding the bar hanger in engagement with the face plate, a support formed integral with the connector for receiving a portion of a T-bar, a catch formed integral with a portion of the support for resilient connection to a portion of the T-bar, a tab engageable with the T-bar for positioning the clip relative to the T-bar, the face plate includes a substantially flat body having a bent edge extending away from the lock; said lock includes a locking projection formed integral with the face plate and extending toward the support, said locking projection having an engagement edge adjacent to the U-shaped connector for contacting the hanger bar; said U-shaped connector including a pair of plate arms formed integral with the flat body, said plate arms being parallel to each other, and a connector arm formed integral with each of the plate arms, each connector arm being substantially parallel to its respective plate arm; said support includes a brace formed integral with the connector arms, a pair of stays formed integral with the brace and being substantially parallel to each other, an upright formed integral with each of the stays, a support base formed integral with the uprights, and a post formed integral with the support base midway between the uprights, said post extending away from the uprights, said uprights, the support base, and the post being in substantially one plane; said catch includes a resilient bracket having one end formed integral with the support base midway between the uprights, a dog formed integral with the bracket at an end opposite the one end, said dog engageable with the T-bar, said dog includes a stand having one end integral with the bracket and a shoulder integral with the stand; and said tab includes a back formed integral with the post, and a pair of lips formed integral with the back and extending toward the face plate, said back and the lips being in the same plane, said lips being engageable with the T-bar.

* * * * *